United States Patent [19]

Kaczynski

[11] Patent Number: 4,502,326

[45] Date of Patent: Mar. 5, 1985

[54] FUEL INJECTION NOZZLE FOR INTERNAL COMBUSTION ENGINES

[75] Inventor: Bernhard Kaczynski, Waiblingen, Fed. Rep. of Germany

[73] Assignee: Robert Bosch GmbH, Stuttgart, Fed. Rep. of Germany

[21] Appl. No.: 483,994

[22] Filed: Apr. 11, 1983

[30] Foreign Application Priority Data

Jul. 27, 1982 [DE] Fed. Rep. of Germany ....... 3227989

[51] Int. Cl.³ ........................................... G01M 15/00

[52] U.S. Cl. ................................................. 73/119 A

[58] Field of Search .................. 73/119 A; 239/533.2; 336/10, 132, 134

[56] References Cited

U.S. PATENT DOCUMENTS 2,365,592 12/1944 Reason ............................ 336/134 X
4,362,051 12/1982 Schlagenhauf .................... 73/119 A

*Primary Examiner*—Jerry W. Myracle
*Attorney, Agent, or Firm*—Edwin E. Greigg

[57] ABSTRACT

A fuel injection nozzle for internal combustion engines is proposed, having a valve needle and an induction coil, the armature of which is coupled with the valve needle and which serves to emit signals depending on the needle stroke or needle speed for a measuring device which can be connected to the injection nozzle. The induction coil is associated with a coil core, which is disposed such that it is displaceable in the axial direction in such a manner that a predetermined value for the initial inductance of the induction coil can be adjusted independently of the tolerances of the individual structural parts of the injection nozzle.

12 Claims, 2 Drawing Figures

FUEL INJECTION NOZZLE FOR INTERNAL COMBUSTION ENGINES

BACKGROUND OF THE INVENTION

The invention is based on a fuel injection nozzle for internal combustion engines as described in the specification and finally claimed. The special advantages of these injection nozzles are that only one induction coil is required for producing the signal and that relatively large variations of the air gap, or of the pole faces defining the air gap, are attainable in percentage terms, so that only relatively little effort and expense are required for signal amplification in the measuring circuit.

In the injection nozzles according to the exemplary embodiments in the prior art, the coil core is not adjustable in the axial direction so that the initial air gap existing between the armature and the coil core when the valve is closed, or the initial size of the pole faces on these elements, is affected by a relatively large number of dimensional tolerances in the individual structural components. This occasions increased production costs if the prescribed size of the initial air gap or of the pole faces has to be adhered to with the utmost accuracy.

OBJECT AND SUMMARY OF THE INVENTION

The apparatus according to the invention has the advantage over the prior art that the size of the initial air gap or of the pole faces is accurately adjustable to the desired value, independently of the dimensional tolerances of the individual structural components, so that the tolerances can be eliminated and/or the storage of the coil cores or armatures which vary in length can be dispensed with. The initial air gap or the initial size of the pole faces can be ascertained by electronic measurement of the initial inductance of the induction coil, for instance, or by mechanical means in that before the injection nozzle is assembled the spacing between the critical faces on the armature and on the coil body are fixed with respect to a reference plane, for instance the plane of separation between the nozzle holder and the shim or the nozzle body, and then an adjusting member which determines the position of the coil core is adjusted accordingly; finally, the coil core is then fixed in the position thus determined.

An advantageous embodiment is attained if the nozzle holder is provided with a bore for receiving the adjusting member, and this bore discharges at an acute angle into the coil core or into the bore receiving the coil body.

To attain an advantageous course of the magnetic field lines, it is proposed that the coil core be displaceably guided in a protrusion of the coil body and provided, on the side remote from the armature, with a protrusion which fits into a narrowed bore section in the nozzle holder to engage it.

The armature influenced by the valve needle, or a linkage element connecting the armature with the valve needle, can be particularly short in length if the coil core passes axially through the induction core and is displaceably guided therein. The arrangement may, however, also be such that both the coil core and the armature extend into the induction coil, and the magnetic air gap between these elements is disposed inside the induction coil.

An abrupt change in the magnetic resistance in the air gap can be attained if either the coil core or the armature has a blind bore oriented toward the armature or the coil core, respectively, into which the armature or the coil core extends with a slight radial play, which embodies the remnant air gap, not later than the end of the opening stroke of the valve needle. Then when the valve needle is closed, the armature or coil core, respectively, can either extend into the blind bore at that time or still be a short distance away from the plane of the mouth of the blind bore. Furthermore, the part which extends into the blind bore may also be embodied conically, so that as the valve needle stroke increases not only is the air gap reduced in size, but also the pole faces on the armature and the coil core which define the air gap increase in size. In a special form of embodiment, the pole faces on the armature and on the coil core may be embodied conically.

For accurate centering of the armature with respect to the blind bore of the coil core, it is proposed that the blind bore be preceded by a bore which guides the armature and is disposed in a body of nonmagnetic material.

The bores in the nozzle holder which act to receive the induction coil and the coil core may be sealed to prevent the escape of leakage oil in a simple manner, in that the coil body and/or the coil core has a sealing ring on its outer circumference.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
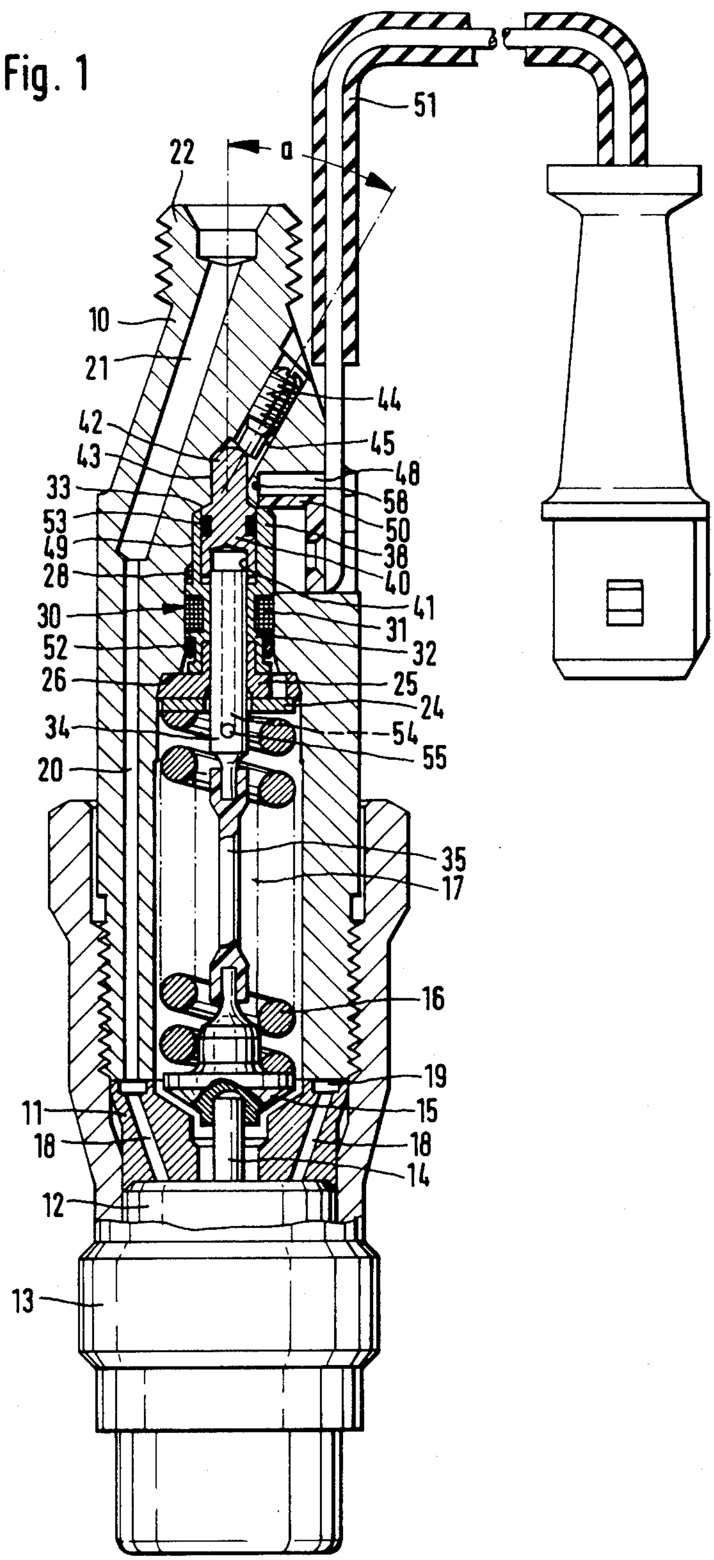
FIG. 1 shows a first exemplary embodiment of the invention, partly in a longitudinal cross section and partly in elevation.

The injection nozzle shown in FIG. 1 has a nozzle holder 10, against which a perforated spacer means or shim 11 and a nozzle body 12 are clamped by a sleeve nut 13. A valve needle 14 is displaceably supported in the nozzle body 12 and is urged in the closing direction, via a pressure piece 15, by a closing spring 16 which is accommodated in a spring chamber 17 of the nozzle holder 10. The valve needle 14 cooperates with an inwardly oriented valve seat in the nozzle body 12 and executes its opening stroke counter to the flow direction of the fuel. In conventional fashion, the guide bore of the valve needle 14 is widened at one point to make a pressure chamber, in the vicinity of which the valve needle 14 has a pressure shoulder oriented toward the valve seat and which pressure chamber communicates via conduits 18, 19 in the spacer means as well as 20 and 21 in the nozzle holder 10, all of which ultimately connect with a fuel connection fitting 22 of the nozzle holder 10. The fuel pressure which engages the pressure shoulder of the valve needle 14 displaces the valve needle 14 upward, counter to the force of the closing spring 16, until a shoulder (not visible) of the valve needle 14 strikes against the upper end face of the spacer means or shim 11 and limits the further upward movement of the valve needle 14.

The closing spring 16 is supported via a disc 24 on a flanged part 25 of magnetically conductive material, which rests on a shoulder 26 of the nozzle housing 10, this shoulder 26 being formed at the transition of the spring chamber 17 to a multi-stepped blind bore 28. An induction coil identified generally as element 30 is inserted into this blind bore 28, and its winding 31 is attached to a coil body 32. The flanged element 25 and the coil body 32 are firmly connected to one another by some suitable process (gluing, embed-injection molding). An armature bolt 34 comprising magnetically conductive material is displaceably guided in the flanged part 25 and in the coil body 32, being firmly connected via an extension 35 with the pressure piece 15 and thereby moving along with the valve needle 14 in both directions. The extension 35 is advantageously realized as a plastic part, which is firmly connected by some suitable method with the armature bolt 34 and the pressure piece 15. As a result of this embodiment of the extension 35, it is assured that the armature bolt 34 is capable of displacement without jamming in the flanged part 25 and the coil body 32.

The coil body 32, which is of non-magnetic material, is provided on its end face remote from the flanged part 25, with a hub-like protrusion 38, in which a coil core 40 cooperating with the armature bolt 34 and made of magnetically conductive material is supported in a displaceable fashion. This coil core 40 has a blind bore 41 in its end oriented toward the armature bolt 34, and the diameter of the blind bore 41 is larger, by the amount of twice the remnant air gap between the armature bolt 34 and the coil body 40, than the diameter of the armature bolt 34. On the other side, the coil core 40 is provided with a protrusion 42, which engages the stepped inner section 43 of the blind bore 28 in a fitting manner because of the metal-to-metal contact. The projection 42 rests with its end face on the downwardly projecting end of a screw element 44, which is threaded into a threaded bore 45 and which extends at an acute angle a relative to the longitudinal axis of the injection nozzle.

A lateral recess 48 is provided in the nozzle holder 10 and is arranged to intersect the bore 28 in the vicinity of its middle section 49 which receives the protrusion 38. Means 50 are provided in the recess 48 for the sealed exit of the winding ends of the induction coil 30 and for connecting them with a cable 51 which continues from there, by way of which an evaluation circuit can be connected to the injection nozzle. For sealing the spring chamber 17 off from the recess 48 and the threaded bore 45, a sealing ring 52 on the circumference of the coil body 32 and a sealing ring 53 on the circumference of the coil core 40 are also provided. A longitudinal bore 54 and a transverse bore 55 are provided in the armature bolt 34 for the pressure relief of the blind bore 41 with respect to the spring chamber 17.

The magnetic field of the induction coil 30 leads via the armature bolt 34, the flanged part 25, the inner portion of the nozzle holder 10, the coil core 40 and the air gap formed between the coil core 40 and the armature bolt 34. In the exemplary embodiment selected here, the arrangement is such that even when the valve is closed, the armature bolt 34 is arranged to extend to a very slight extent into the blind bore 41. As a result, the smallest air gap already exists between the armature bolt 34 and the coil core 40 in the outset position, resulting from the radial play between these two elements. The signal-generating variation in the magnetic field resistance is brought about in that upon the opening stroke of the valve needle 14, the armature bolt 34 will extend more deeply into the blind bore 41, and the pole faces of the elements defining the air gap increase in area accordingly.

The initial surface area of the pole faces when the valve is closed can be set to any desired value by means of the screw 44. The value, once set, may be ascertained for instance by detecting the inductance of the coil by means of an electronic circuit. However, this setting can also be accomplished by means of purely mechanical measurement. To this end, before the injection nozzle is assembled, the distance between the free end faces of the armature bolt 34, for instance, from the upper end face of the spacer means or shim 11 and the distance between the free end face of the coil core 40 from the lower end face of the nozzle holder 10 are ascertained. The desired difference between the two distances can be adjusted easily by turning the screw 44 appropriately. After this adjustment has been made, the coil core 40 is fixed in the nozzle holder 10 by bracing it, by means of a tool introduced into the recess 48 at the point 58.

The apparatus according to the invention is not restricted to the construction shown and described herein. The air gap could, for instance, also be embodied between flat pole faces, directed at right angles to the longitudinal axis of the injection nozzle, in which case the emission of the signal is brought about solely by varying the length of the air gap. It is also conceivable for one or both pole faces on the armature bolt 34 and coil core 40 or blind bore 41 to be realized in conical shape, so that upon the stroke of the valve needle 4, both a reduction of the (average) air gap and an increase in the pole faces defining the air gap are attained. A particularly advantageous apparatus is one in which in the closing position of the valve needle 14, the armature bolt 34 does not yet extend into the blind bore 41, because then particularly large variations in the magnetic resistance can be attained via the valve needle stroke.

The adjustability of the coil core is furthermore not restricted to the condition where the coil core is disposed on the side of the winding of the induction coil remote from the valve needle 14 and where the armature bolt passes through the coil body.

Figure 2:
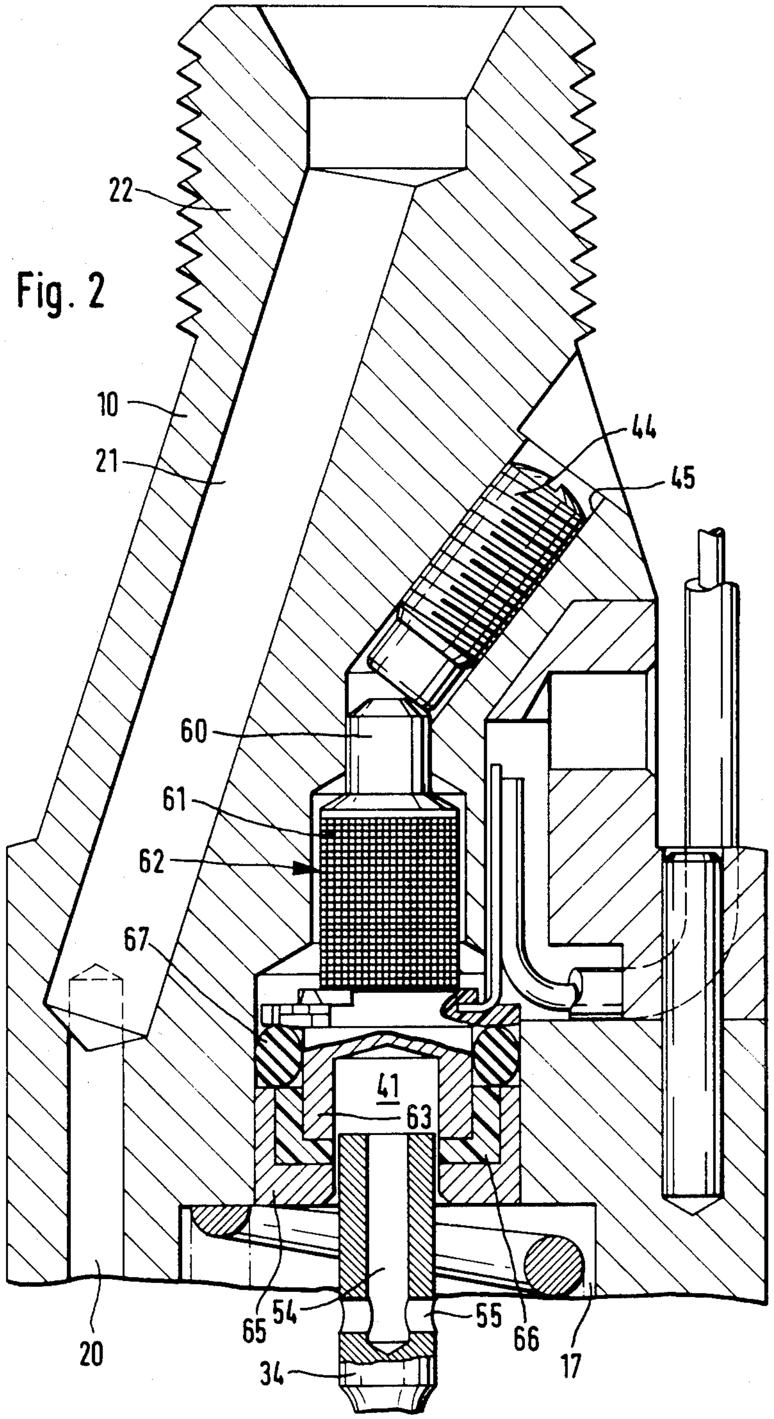
FIG. 2 shows a partial longitudinal cross section, on a larger scale than FIG. 1, through the second exemplary embodiment of the invention.

In the exemplary embodiment of FIG. 2, the apparatus is designed such that a coil core 60 is passed through the winding 61 of an induction coil generally identified as element 62 with the lower end of the coil core having a thickened end 63 which protrudes out from the winding 61 and in which end 63 the blind bore 41 cooperating with the armature bolt 34 is disposed. The armature bolt 34 in this embodiment is substantially shorter than in the exemplary embodiment of FIG. 1 and furthermore is shaped such that it tapers in conical fashion at its free end, so that during the valve needle strokes, both reductions in the air gap and increases in the pole face size are attained. For fixing the induction coil 62 and for conducting the magnetic field lines further, a flanged part 65 of magnetically conductive material is provided here as well, this latter part arranged to rest via a magnetically insulating shaped part 66 on the end 63 of the coil core 60 and being connected therewith, for instance by means of an adhesive. The shaped part 66 simultaneously serves to guide the armature bolt 34. To prevent the escape of leakage fluid from the spring chamber 17, a sealing ring 67 is clamped between the nozzle holder and the end 63 of the coil core 60. As in the exemplary embodiment of FIG. 1, the coil core 60 is fixed in the nozzle holder by means of bracing.

In this exemplary embodiment the blind bore 41 could also be embodied in the armature bolt 34 instead of in the coil core 60; for this purpose, the armature bolt would then have to be provided with a thickened head portion.

In another exemplary embodiment, not shown, both the coil core and the armature bolt extend into the induction coil, and the magnetic air gap is formed inside the induction coil.

The foregoing relates to exemplary embodiments of the invention, it being understood that other embodiments and variants thereof are possible within the spirit and scope of the invention, the latter being defined by the appended claims.

What is claimed and desired to be secured by Letters Patent of the United States is:

1. An injection nozzle for internal combustion engines comprising a nozzle body having a valve seat, a spring for loading a valve needle which is arranged to pass through said seat, a valve needle, said nozzle body being further attached to a nozzle holder, said nozzle holder provided with a chamber for said loading spring and a stepped bore thereabove arranged to receive a coil core having a coil body and an associated induction coil, said valve needle being further provided with an armature and said armature further arranged to extend through said induction coil into said coil bore and means in said nozzle holder for axial adjustment of said coil core.

2. An injection nozzle as claimed in claim 1, wherein said nozzle holder is provided with a threaded bore at an acute angle (a) and said means is threaded into said bore.

3. An injection nozzle as defined by claim 1, wherein said coil core is displaceably guided in a coil body and said coil core is further provided with a protrusion which is arranged to be received in a bore in said nozzle holder.

4. An injection nozzle as defined by claim 1, wherein said coil core further includes an integral protrusion which is engageable by said means.

5. An injection nozzle as defined by claim 1, wherein said coil core passes axially through said induction coil and is displaceably guided therein.

6. An injection nozzle as defined by claim 1, wherein a magnetic air gap is formed inside the induction coil.

7. An injection nozzle as defined by claim 1, wherein said coil core further includes a blind bore, embodying a remnant air gap, oriented toward said armature and into which said armature extends with a slight radial play.

8. An injection nozzle as defined by claim 8, wherein said blind bore of said coil core is provided by a bore in said coil body which is further constructed of nonmagnetic material.

9. An injection nozzle as defined by claim 1, wherein said coil body and said coil core have interengaging surfaces between which a sealing ring is disposed.

10. An injection nozzle as defined by claim 1, wherein a sealing ring is disposed between said nozzle body and said coil core.

11. An injection nozzle as defined by claim 1, wherein said loading spring is supported on a pressure element which engages said valve needle and further that said pressure element engages an extension means which is associated with said armature.

12. An injection nozzle as defined by claim 11, wherein said extension means is a plastic member.

* * * * *